March 28, 1950  A. E. WOOD ET AL  2,502,299
CONTROL LEVER CHECK MECHANISM
Filed Jan. 11, 1949  3 Sheets-Sheet 1
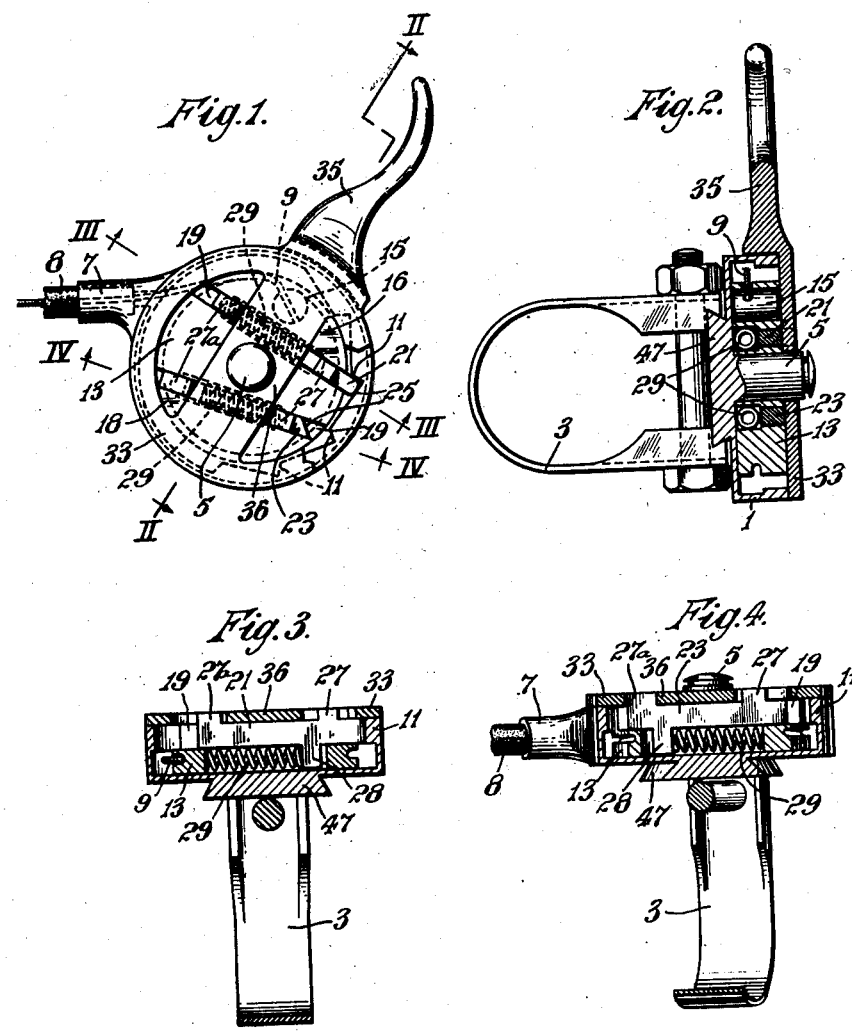
INVENTORS
Albert Edward Wood
Arthur Sleigh Lowe
By Lewis & Bateman
ATTORNEYS

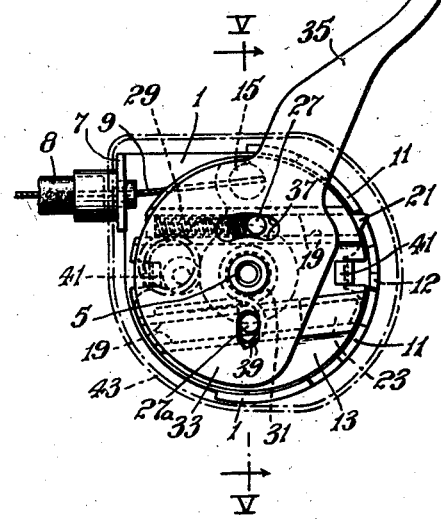

March 28, 1950  A. E. WOOD ET AL  2,502,299
CONTROL LEVER CHECK MECHANISM
Filed Jan. 11, 1949  3 Sheets-Sheet 3
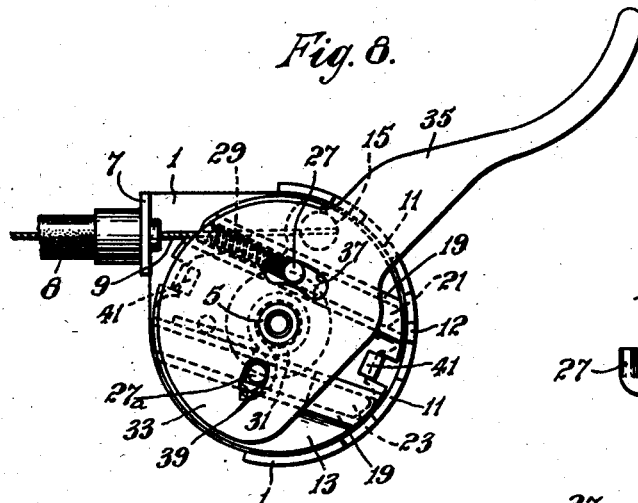
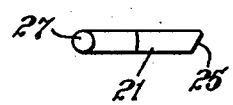
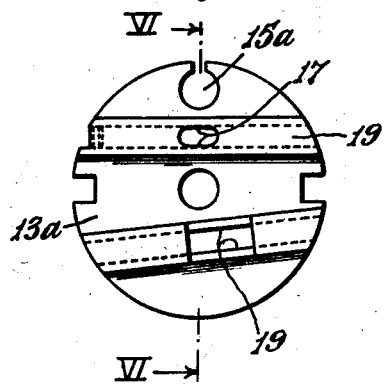
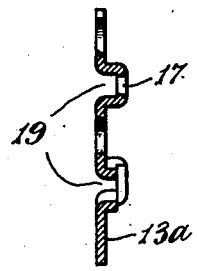
INVENTORS
Albert Edward Wood
Arthur Sleigh Lane
By Morris & Bateman
ATTORNEYS Patented Mar. 28, 1950

2,502,299

UNITED STATES PATENT OFFICE 2,502,299

CONTROL LEVER CHECK MECHANISM

Albert Edward Wood and Arthur Sleigh Lowe, Birmingham, England, assignors to The Birmingham Small Arms Company Limited, Birmingham, England, a British company Application January 11, 1949, Serial No. 70,266 In Great Britain January 16, 1948

8 Claims. (Cl. 74—565)

This invention relates to control lever mechanism of the kind which is adapted to be moved into and set in any one of two or more positions, and is particularly suitable for effecting a gear change in the variable speed gears of cycles.

Control lever mechanisms of the kind referred to embody a pawl and ratchet mechanism in which a pivoted control lever is usually adapted to co-operate with and actuate a single spring-loaded rocking pawl which normally engages with teeth on a fixed ratchet plate, the arrangement being such that movement imparted by pressure applied to the control lever in one direction to effect a hub gear change against the action of a spring tensioned cable causes the pawl to ride over and on release of the lever to engage with another ratchet tooth, while momentary pressure on the control lever in an opposite direction with the action of a spring tensioned cable causes the pawl to be retracted against its spring clear of engagement with a ratchet tooth and to be moved into contact with the adjacent ratchet tooth.

In such constructions only a single pawl is usually employed in conjunction with ratchet teeth for effecting step-by-step changes in either direction of movement of the control lever so that there is a liability of the pawl failing to engage with an adjacent ratchet tooth before the lever has been drawn past the required tooth engaging position in the direction of movement where pressure on the control lever is only momentary, and in consequence when the control is used in conjunction with a variable speed gearing in which the gearing is moved in one direction by a spring which is compressed by movement of the gearing in an opposite direction, there is a liability for the spring to cause a gear position on the control lever mechanism to be "jumped."

It is an object of this invention to provide an improved construction and arrangement of control lever mechanism whereby the liability of a gear position to be "jumped" under the circumstances aforesaid is minimised.

It is a further object of the invention to provide an improved control lever mechanism which is compact in structure, neat in appearance, and which can be readily adjusted to almost any angular position when applied to the handlebar of a bicycle.

In order that the invention may be clearly understood two embodiments thereof will now be described with reference to the accompanying drawings illustrative of a control lever mechanism as adapted for use with a cycle three speed gear hub, wherein similar reference numerals refer to similar parts throughout the several views. In these drawings:

Figure 1 is a plan view (with cover removed) of a control lever mechanism constructed in accordance with one example of the invention, Figure 2 is a sectional view taken on line II—II, Figure 1, Figure 3 is a sectional view taken on line III—III, Figure 1, Figure 4 is a sectional view taken on line IV—IV, Figure 1, Figure 5 is a plan view of a control lever mechanism constructed in accordance with another example of the invention, Figure 6 is a sectional view taken on line V—V, Figure 5, Figure 7 is a plan view similar to Figure 5 showing the mechanism in one of its operative positions, Figure 8 is a further plan view of the mechanism as shown in Figure 5 in another operative position, Figure 9 is a side view of the body part or casing of the mechanism shown in Figure 5, Figure 10 is a plan view of the pawl carrying plate, as shown in Figure 5, Figure 11 is a sectional view taken on line VI—VI, Figure 10.

Figure 12 is a side view of one of the pawl elements of the mechanism shown in Figure 5, and Figure 13 is a plan view of the pawl element.

Referring to Figures 1 to 4, the control lever mechanism comprises a body part or casing 1 which is adapted to be rigidly attached to the handlebar of a bicycle by means of a suitable clip 3, fixed to the casing, said casing having formed on or fitted thereto a pivot stud 5 and being shaped to provide a bracket 7 constituting a tangential guide and an abutment for the outer sheath 8 of a flexible transmission cable 9. On the inner side of a flange projecting from the periphery of the casing 1 is formed a series of teeth or steps 11, and rotatably mounted within the body part or casing 1 on the pivot stud 5 is a pawl carrying plate 13 in the form of a disc. The periphery of the plate 13 is preferably grooved to receive the cable 9 of a flexible transmission, the end of the cable being attached to the plate at a point adjacent to the periphery by any known means, such as a roller 15 engaging with a complementary recess formed in the pawl plate.

On the upper flat face of the pawl plate 13 are formed, adjacent to the periphery thereof, diametrically opposed lugs or projections 16, 18 for the purpose hereafter described, and in the face of the plate two slots 19 are cut to receive a pair of slidable spring-loaded pawl elements 21, 23, said slots having closed ends and being so angularly disposed in relation to each other that the operative ends 25 of the pawl elements are in alignment with an adjacent pair of teeth 11. As seen in Figures 3 and 4 the elements 21, 23 constituting respectively main and auxiliary pawls, comprise rods or plungers substantially square in section to slidably fit within the slots 19, and on each rod are formed two upwardly extending lugs or projections 27, 27a, the lug 27 on the pawl element 21 and the lug 27a on the pawl element 23 normally lying adjacent to the lugs 16, 18 respectively on the pawl plate 13. On the opposite side of each pawl element is formed a further lug or projection 28 which is adapted to constitute an abutment for a coiled spring 29 located in an aperture in the pawl plate which is formed in the base of the plate and lies in axial alignment with each slot, the ends of the slots 19 forming stops for the lugs 28 and the other end of the spring 29 respectively, the arrangement being such that the main pawl 21 is spring loaded axially towards the teeth 11 and the auxiliary pawl 23 away therefrom.

Pivotally mounted on the stud 5 and located adjacent to the rotatable pawl plate 13 is a control lever 33 provided with an operating arm 35 and adapted to engage with the respective lugs or projections 16, 18 on the pawl plate 13 and with the lugs 27, 27a on the pawl elements 21, 23. This lever has two arcuate cut-away portions the parallel chords of which form a cam bar 36 extending diametrically with respect to the pivot stud 5. The projections 16, 18 on the pawl plate 13 are each located in one of the corners of the cut-away portion, and when the lever 33 is actuated in one direction or the other the edge of the cam bar 36 will impart by virtue of the lugs 16, 18 a rotary movement to the circular plate 13 and simultaneously, as later explained, a movement along a chord line of the plate to either one or both of the pawl elements 21, 23 to bring them into engagement with the teeth 11 on the fixed body part 1 of the control mechanism.

The pawl plate 13 and control lever 33 are enclosed by a cover plate (not shown) and in order to provide for adequate adjustment or positioning of the mechanism on a cycle handlebar, the fixed casing has formed on the underside thereof a circular inwardly tapering flange 47 adapted to be engaged by a complementary groove formed in each end of a U-shaped clip 3 which surrounds the handlebar, the ends of the clip being clamped by a bolt and nut to the periphery of the aforesaid flange.

The operation of the mechanism above described is as follows: When pressure is applied through the operating arm 35 to the control lever 33 in a clockwise direction to effect a gear change, against the pull on the cable 9 imparted by a coil spring associated with the hub gear by contact of the cam bar 36 with the lug or projection 16, the spring-loaded main pawl 21 on the rotating pawl plate 13 will be caused to ride up the inclined face of a tooth 11 and so be retracted against its spring 29 until the edge of the adjacent tooth is reached, when the pawl shoots forward into the tooth or teeth to engage the next gear position. In this direction of movement of the control lever 33 the auxiliary pawl 23 is not influenced by the lever cam bar 36 and remains clear of engagement with the teeth 11 by reason of the fact that it is spring-loaded away from the teeth, i. e. in a direction opposite to that of the main pawl 21, and contact of the cam bar 36 with the projection 27a has no influence on said pawl 23.

When the control lever 33 is moved in an anti-clockwise direction, the contact of the cam bar 36 with the projection 27 on the auxiliary pawl 23 causes it to be moved against its spring 29 into engagement with a tooth 11 while simultaneously the main pawl 21 already in engagement with an adjacent tooth is similarly withdrawn therefrom by contact of the cam bar 36 with the projection 27a against the action of its spring. This combined cam action is however so arranged that the auxiliary pawl 23 is moved towards a tooth slightly in advance of the retracting main pawl 21, so that when the auxiliary pawl has reached full engagement with the tooth in alignment therewith the main pawl is clear of its tooth engagement, but no matter how the pressure is applied to the lever it will be impossible to cause the control mechanism to "jump" the next gear position owing to the locking of the plate 13 to the casing 1 by the auxiliary pawl 23. When however pressure is released from the operating arm 35 the auxiliary pawl 23 is automatically retracted by its spring 29, and the angular relation of the operative end 25 of the pawl 23 to that of the tooth 11 is such that initial retraction of the pawl permits a slight rotation of the pawl carrying plate 13, under the influence of the spring tensioned cable 9, whereby the operative end of the main pawl 21 is positioned on the inclined face of the adjacent tooth so that on withdrawal of the auxiliary pawl 23 the pawl carrying plate 13 is further rotated by the spring tensioned cable 9 to bring the main pawl 21 into engagement with the tooth and thereby permits a change of gear being effected.

In the modified arrangement shown in Figures 5 to 13, which is designed with a view to facilitating manufacture, the body part or casing 1 is adapted to be attached to the bicycle handlebar by the clip 3 fixed to the casing. This casing has secured thereto a pivot stud 5 and is shaped to provide a bracket 7 constituting a tangential guide and abutment for a flexible transmission cable 9. The casing 1 is made as a pressing and comprises a base having a circular edge and, projecting therefrom, a vertical wall constituting a flange in which slots are cut forming teeth or notches 11. As seen in Figure 9 a portion of the outer edge of the flange over a sector which embraces the notches is removed to thereby form a peripheral recess in which the operating arm 35 of the control lever is adapted to move, the end of the recess forming a stop 12 limiting the movement of the control lever in a clockwise direction against the spring tension on the cable 9.

The pawl carrying plate 13 in the form of a disc is produced from two pressings constituting upper and lower discs 13a, 13b which are secured together in a manner hereinafter described and freely mounted within the body part or casing 1 on the pivot stud 5. The periphery of the plate 13 is grooved to receive the cable 9, the end of which is attached to the plate at a point adjacent to the periphery by known means such as a roller 15 engaging with a complementary recess 15a formed in the pawl plate. The upper disc 13a has formed therein a slot in one of two channels 19 set at appropriate angles which when the two discs are secured together form housings wherein are slidably mounted main and auxiliary pawls 21, 23 respectively which, as seen in Figures 12 and 13, are in the form of rods. The pawls 21, 23 are similar in construction, the notch engaging end having a tapered nose portion 25. On the rear end of the main pawl 21 is formed an upwardly projecting peg 27, and a similar peg 27a is formed on the auxiliary pawl 23, the peg 27 on the pawl 21 egaging with the slot 17 in the pawl plate, while the pegs on both pawls each engage with further slots in a control lever, as hereafter described.

The main pawl 21 is spring-loaded towards the notches 11 by means of a helical compression spring 29 which is situated between the closed end of the channel and the peg end of the pawl. The auxiliary pawl 23 is spring-loaded away from the notches 11 by means of a torsion spring 31 mounted upon the pivot stud 5 fixed to the casing 1, one end of the torsion spring engaging the pawl peg 27a and the other end contacting with the side of one of the channels 19.

The control lever 33 comprises a body part of roughly semi-circular form with an operating arm 35 projecting from it. The body part is provided with a circular hole, by means of which it is freely mounted upon the pivot stud 5 of the device, and a short distance away from this hole is an arcuate slot 37 which co-operates with the upstanding peg 27 on the main pawl 21. Approximately opposite to the slot 37, on the other side of the circular pivot hole, is a smaller hole 39 which is slightly elongated in a direction radially from the pivot stud 5. This hole 39 co-operates with the upstanding peg 27a on the auxiliary pawl 23.

The upper and lower discs 13a, 13b constituting the pawl plate are preferably capable of detachment from each other in order that replacement or repair of the pawls and associated parts may be effected. To this end the plates may be secured by bending projections or tongues 41 formed on the lower plate 13b over the edge of upper plate 13a or vice versa. Bent-up projections from the bottom or top plate may also serve to close the appropriate end of each of the pawl carrying channels.

The parts of the control lever mechanism are protected by a cover plate 43 which conveniently may be secured by means of a screw 45 engaging with a tapped hole formed in the top of the pivot stud 5.

The mechanism operates in essentials in the same manner as the mechanism previously described, that is to say, when the control lever 33 is moved in a clockwise direction, as seen in Figure 8, against the action of the spring tension applied by the hub gear spring to the flexible transmission cable 9, the pawl carrying plate 13 is moved around the pivot stud 5 by virtue of the peg-and-slot connection 17, 27, between the control lever and the main pawl 21. During such turning of the plate 13, the inclined face on the nose 25 of the main pawl 21 contacts with the edge of an adjacent notch and is retracted against the action of the spring 29, such retraction being retained during continued turning of the plate 13 until the space is reached between the next notch, when under the influence of the spring 29, the pawl 21 shoots forward to engage the notch establishing the next gear position. During this movement of the plate 13 the auxiliary pawl 23 is held out of engagement with the notches.

When the control lever 33 is moved in an opposite or anti-clockwise direction, as seen in Figure 7, that is, with the action of the hub gear spring tension applied to the transmission cable 9, the auxiliary pawl 23 is, by means of the pin-and-slot connection 27a, 39 between it and the control lever, moved against the spring 31 into engagement with a notch 11. Movement of the auxiliary pawl 23 is in advance of the withdrawal of the main pawl 21 from a notch by virtue of the free movement provided by the slot 37 before the peg 27 is contacted by the control lever 33, and continued pressure on the control lever produces no further motion since it would merely tend to force the auxiliary pawl 23 harder into engagement with the notch. Release of pressure on the control lever 33, however, allows an initial retraction from a notch 11 of the auxiliary pawl 23 through the spring 31, thereby permitting a slight rotary movement of the pawl carrying plate 13 by the spring tensioned cable 9. This positions the end of the retracted main pawl 21 whereby it abuts against the wall of the casing 1 between the notches so that on withdrawal of the auxiliary pawl 23 the pawl carrying plate and control lever 33 are further rotated by the spring tensioned cable 9 to bring the main pawl 21 into engagement with the next notch and thereby permits a change of gear being effected.

Having thus described our invention, what we claim as new and desire to secure by Letters Patent is:

1. Control lever mechanism comprising a fixed body part having a pivot thereon and provided with a series of teeth, main and auxiliary pawl members engageable with said teeth, a combined actuating and pawl member carrying plate mounted rotatably about the pivot on the body part and positively constrained to move in one direction, yieldable means urging the main pawl members towards engagement with the teeth, yieldable means urging the auxiliary pawl member away from engagement with the teeth, and means including a control lever cooperative with the main and auxiliary pawl members for engaging said members with said teeth.

2. Control lever mechanism as defined in claim 1, wherein said pawl members have projections thereon, and said control lever is mounted rotatably about the pivot on the body part and is provided with cam faces cooperable with the projections on the pawl members.

3. Control lever mechanism as defined in claim 1, wherein said pawl member carrying plate comprises a disc having oppositely disposed lugs thereon, and the body of said disc is provided with slots to slidably receive the pawl members, and said yieldable means comprise coil springs associated with the respective pawl members and spring load said members in opposite directions.

4. Control lever mechanism as defined in claim 1, wherein said pawl member carrying plate has oppositely disposed projections thereon, and said control lever is mounted to rotate about the pivot on the body part and is provided with an operating arm and with two arcuate cut-away portions having parallel chords which form a cam bar extending diametrically relatively to said pivot, said cam bar engaging the projections on the pawl member carrying plate on opposite sides of the cam bar.

5. Control lever mechanism as defined in claim 1, wherein said pawl members are substantially square in cross-section, and each pawl member has two projections on one face thereof engageable by said control lever and a single projection on its opposite face constituting an abutment for the respective yieldable means.

6. Control lever mechanism as defined in claim 1, wherein said pawl member carrying plate comprises two discs secured together, one of said discs having two channel portions therein which form with the other disc channels which constitute housings to slidably receive the pawl members, an end of one of the channels being closed to form an abutment, and a coil spring engaging said abutment and imparting axial thrust in one direction to one of the pawl members, and a torsion spring mounted on the pivot on the body part for imparting axial thrust to the other pawl member.

7. Control lever mechanism as defined in claim 1, wherein said control lever is pivotally mounted on the pivot on the body part and is provided with an operating arm, said lever having two pawl member engaging slots formed therein and disposed substantially opposite to each other on opposite sides of said pivot, one of said slots being arcuate in shape and the other slot being slightly elongated radially, and said pawl members being provided with projections, and each slot in the control lever being engageable with one of the pawl members through the respective projection thereon.

8. Control lever mechanism comprising a fixed body part having a pivot thereon and provided with a series of teeth, main and auxiliary pawl members engageable with said teeth, a combined actuating and pawl member carrying plate mounted rotatably about the pivot on the body part and positively constrained to move in one direction, means yieldingly urging the main pawl member towards engagement with said teeth, means yieldingly urging the auxiliary pawl member away from engagement with said teeth, the main and auxiliary pawl members comprising plungers slidably mounted on the pawl member carrying plate and being positioned to operatively engage adjacent pairs of said teeth, and being tensioned in such manner that the main pawl member tends to be forced into engagement with said teeth while the auxiliary pawl member tends to be retracted from said teeth.

ALBERT EDWARD WOOD.
ARTHUR SLEIGH LOWE.

REFERENCES CITED

The following references are of record in the file of this patent:

UNITED STATES PATENTS

| Number | Name | Date |
| --- | --- | --- |
| 772,894 | Le Blond | Oct. 18, 1904 |

FOREIGN PATENTS

| Number | Country | Date |
| --- | --- | --- |
| 9,010 | Great Britain | Apr. 4, 1912 |